United States Patent [19]
Buchel et al.

[11] 3,725,549
[45] Apr. 3, 1973

[54] N-TRITYL-IMIDAZOLES FOR CONTROLLING PLANT FUNGI

[75] Inventors: Karl-Heinz Buchel, Wuppertal-Elberfeld; Erik Regel, Wuppertal-Cronenburg; Ferdinand Grewe, Bursheid; Hans Scheinpflug; Helmut Kaspers, both of Leverkusen, all of Germany

[73] Assignee: Bayer Aktiengesellschaft, Leverkusen, Germany

[22] Filed: Sept. 13, 1971

[21] Appl. No.: 180,105

Related U.S. Application Data

[63] Continuation of Ser. No. 789,601, Jan. 7, 1969, abandoned, and a continuation of Ser. No. 789,602, Jan. 7, 1969, abandoned.

[30] Foreign Application Priority Data

Jan. 29, 1968  Germany..................P 16 70 976.5
Jan. 29, 1968  Germany..................P 16 70 977.6

[52] U.S. Cl..................................................424/273
[51] Int. Cl..................................................A01n 9/22
[58] Field of Search....................................424/273

[56] References Cited

UNITED STATES PATENTS 3,321,366  5/1967  Mussell................................424/273

*Primary Examiner*—Jerome D. Goldberg
*Attorney*—Jacobs & Jacobs

[57] ABSTRACT

Plant fungicial compositions are produced which comprise an amount of a compound of the formula:

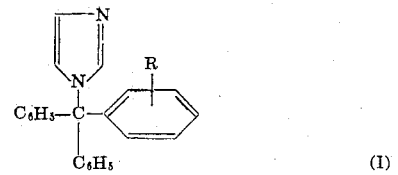

(I)

wherein

R is chloro, bromo or fluoro, or a salt thereof, sufficient to be effective for killing, combatting or controlling plant fungi, in combination with a solid or liquid diluent or carrier. Methods for killing, combatting or controlling fungal diseases in plants comprise applying to the fungi or to the plant to be protected an effective or toxic amount of the above compound.

22 Claims, No Drawings

N-TRITYL-IMIDAZOLES FOR CONTROLLING PLANT FUNGI

This is a continuation consolidating our copending U.S. Ser. Nos. 789,601 and 789,602 both filed Jan. 7, 1969 and now abandoned.

The present invention relates to and has for its objects the provision for particular new [(chloro, bromo or fluoro-substituted phenyl)-(bis-phenyl)-methyl]-imidazoles and salts thereof, which possess fungicidal properties, active compositions in the form of mixtures of such compounds with solid and liquid dispersible carrier vehicles, and methods for producing such compounds and for using such compounds in a new way especially for combating fungi, with other and further objects becoming apparent from a study of the within specification and accompanying examples.

It is already known that N-trityl-imidazoles of the general formula

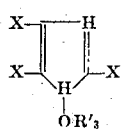

(i)

in which
X is an alkyl of aryl radical, and
R' is an aryl radical of the formula

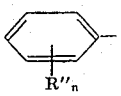

(ii)

in which
R'' is a halogen atom or a lower alkyl radical, and
n is 0, 1 or 2
exhibit fungitoxic properties (compare U.S. Pat. No. 3,321,366).

However, no N-trityl-imidazoles of the formula (i) stated above are known in which X is always hydrogen and one of the radicals R' is substituted by R'' while the two other radicals R' have no substituents.

It has now been found, in accordance with the present invention, that the particular new N-trityl-imidazoles of the formula

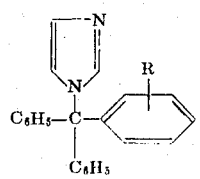

(I)

in which
R is chloro, bromo or fluoro,
or salts thereof, exhibit strong fungicidal properties. The salts of formula I are 1-[(chloro,bromo or fluoro-substituted phenyl)-(bis-phenyl)-methyl)]-imidazolium salts of inorganic and organic acids. These salts may be represented by the formula:

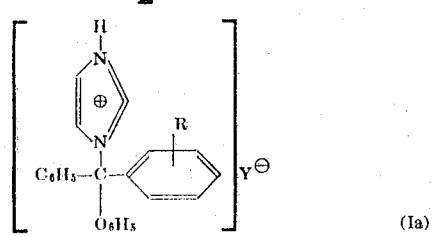

(Ia)

in which
R is chloro, bromo or fluoro, and
Y is the anion of an inorganic or organic acid.

The present invention also provides a process for the production of the N-trityl-imidazoles of the formula (I) above in which a tritylhalide of the formula

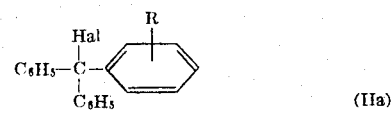

(IIa)

in which
R is the same as defined above, and
Hal is a halogen atom, preferably chlorine,
is reacted with imidazole (IIb) in a polar inert organic solvent at a temperature of from 0° to 100° C, in the presence of an acid binder.

The invention also provides a process for the production of the N-trityl-imidazolium salts of formula (I and Ia) in which a trityl-imidazole of the formula:

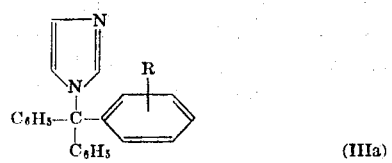

(IIIa)

in which
R is the same as defined above,
is reacted with an inorganic or an organic acid (IIIb).

The term solvent as used herein includes mere diluents.

It is decidedly surprising that the specific N-trityl-imidazoles and salts thereof according to the present invention have a considerably stronger fungitoxic activity than the chemically very similar N-trityl-imidazoles previously known. The active compounds according to the present invention therefore represent a valuable enrichment of the art.

The course of the reaction can be illustrated by means of the following reaction mechanisms:

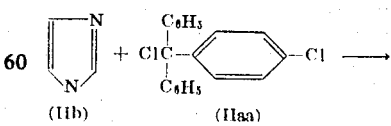

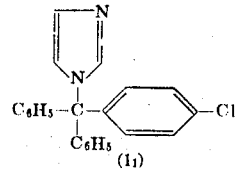

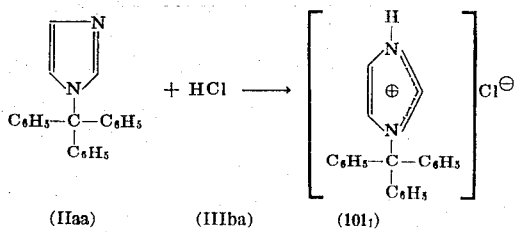

(IIaa)   (IIIba)   (101₁)

Advantageously, in accordance with the present invention, in the various formulas set forth herein:

R represents
o-, m- and p-chloro, bromo or fluoro, especially
o-, m- and p-chloro, o-, m- and p-fluoro and p-bromo.

According to formula (Ia), Y is preferably the anion of the following inorganic or organic acids:

inorganic acid, i.e. mineral acid, such as a hydrohalic acid including hydrochloric acid, hydrofluoric acid, hydrobromic acid and hydroiodic acid; sulfuric acid; ortho-phosphoric acid; nitric acid; and the like, especially mono- and poly- basic inorganic acids, such as mono- to tri- basic inorganic acids, preferably halides and particularly chloride; or organic acid including aliphatic carboxylic acids, e.g. lower aliphatic hydrocarbon carboxylic acid, especially having two to eight carbon atoms, such as mono- and poly- carboxylic, including mono- to tri- carboxylic, saturated and unsaturated, e.g. mono- and di- ethylenically unsaturated, optionally mono- and poly-, especially mono- to tri-, hydroxy-substituted, acids; including lower alkanoic, especially $C_{2-8}$ or $C_{2-6}$ alkanoic, acids such as acetic, propionic, butyric, pentanoic, hexanoic, heptanoic, octanoic, and the like, acids;

lower alkanedioic, especially $C_{3-8}$ or $C_{3-6}$ alkanedioic, acids such as malonic [HOOC—CH₂—COOH], succinic [HOOC—(CH₂)₂—COOH], glutaric [HOOC—(CH₂)₃—COOH], adipic [HOOC—(CH₂)—(CH₂)₄—COOH], pimelic [HOOC—(CH₂)₅—COOH], suberic [HOOC—(CH₂)₆—COOH], and the like, acids;

lower alkanetricarboxylic acids, especially $C_{5-8}$ or $C_{6-8}$ alkanetricarboxylic, acids such as tricarballylic [(HOOC—CH₂)₂—CH—COOH], and the like, acids;

lower alkanoic, especially $C_{3-8}$ or $C_{3-6}$ alkenoic, acids such as acrylic [CH₂—CH—COOH], crotonic [CH₃CH=CH—COOH], methacrylic [CH₂=₃)—COOH], vinylacetic [CH₂=CH—CH₂—COOH], pent- -2-, -3- and -4- -enoic, hex- -2-, -3-, -4- and -5- -enoic, pyroterebic [(CH₃)₂—C=CH—CH₂—COOH], and the like, acids;

lower alkadienoic, especially $C_{5-8}$ or $C_{5-6}$ alkadienoic, acids such as sorbic [CH₃(—CH=CH—)₂—COOH], and the like, acids;

lower alkenedioic, especially $C_{4-8}$ or $C_{4-6}$ alkenedioic, acids such as maleic [cis HOOC—CH=CH—COOH], fumaric [trans HOOC—CH=CH—COOH], citraconic [HOOC—C(CH₃)=CH—COOH], allylmalonic [CH₂=CH—CH₂—CH(COOH)₂], and the like, acids;

lower alkdienedioic, especially $C_{5-8}$ or $C_{5-6}$ alkdienedioic, acids such as muconic [HOOC—CH=CH—CH=CH—COOH], and the like, acids; and hydroxy-substituted lower, e.g. $C_{2-8}$ or $C_{2-6}$ or $C_{2-4}$, alkanoic, hydroxy-substituted lower, e.g. $C_{3-8}$ or $C_{3-6}$ alkanedioic, and hydroxy-substituted lower, e.g. $C_{5-8}$ or $C_{6-8}$ alkanetrioic, acids such as glycollic [HO—CH₂—COOH], lactic [CH₃—CH(OH)—COOH], malic [HOOC—CH₂—CH(OH)—COOH], tartaric [HOOC—CH(OH)—CH(OH)—COOH], citric [HOOC—CH₂—C(OH)(COOH)—CH₂—COOH], and the like, acids, especially mono- to tri- hydroxy alkan mono- to tri- oic acid; and aromatic mono- and poly- carboxylic acids including $C_{6-10}$ aryl hydrocarbon carboxylic acids, e.g. aromatic or $C_{6-10}$ aryl mono- to tri- carboxylic acids, optionally mono- and poly-, e.g. mono-to tri-, hydroxy substituted, especially benzene mono- and poly-, e.g., mono- to tri-, carboxylic acids, optionally mono- and poly-, e.g., mono- to tri-, hydroxy substituted, including benzene monocarboxylic acid, i.e. benzoic acid benzene dicarboxylic acids, such as phthalic, isophthalic and terephthalic acids, i.e. ortho, meta and para dicarboxyl benzene;

benzene tricarboxylic acids such as hemimellitic, mellitic and trimesic acids, i.e. 1,2,3-, 1,2,4- and 1,3,5-tricarboxyl benzene; and the like, monohydroxy-benzene monocarboxylic acids such as salicylic acid, i.e. orthohydroxy-benzene monocarboxylic acid, as well as meta and para hydroxy-benzene monocarboxylic acid, and the like;

dihydroxy-benzene monocarboxylic acids such as 5-hydroxyl salicylic acid (gentistic acid), i.e. 2,5-dihydroxy-benzoic acid, resorcylic acid, i.e. 3,5-, 2,4- and 2,6-dihydroxy-benzoic acid, and the like;

trihydroxy-benzene monocarboxylic acids such as pryogallol carboxylic acid, i.e. 2,3,4-trihydroxy benzoic acid, and the like;

monohydroxy-benzene dicarboxylic acids such as hydroxy phthalic, isophthalic and terephthalic acids, i.e. 4-hydroxy-1,2-dicarboxyl benzene, 3-hydroxy-1,2-dicarboxyl benzene, 2-hydroxy-1,2-dicarboxyl benzene, 4-hydroxy-1,3-dicarboxyl benzene, 5-hydroxy-1,3-dicarboxyl benzene, 2-hydroxy-1,4-dicarboxyl benzene, and the like;

dihydroxy-benzene dicarboxylic acids such as 3,4- and 3,5- dihydroxy-1,2-dicarboxyl benzene, 2,4- and 2,5-dihydroxy-1,3-dicarboxyl benzene, 2,3- and 2,5-dihydroxy-1,4-dicarboxyl benzene, and the like;

trihydroxy-benzene dicarboxylic acids such as 3,4,5-dihydroxy-1,2-dicarboxylbenzene, 2,4,5-dihydroxy-1,3-dicarboxyl benzene, 2,3,5-dihydroxy-1,4-dicarboxyl benzene and the like;

monohydroxy-benzene tricarboxylic acids such as 4- and 5-hydroxy-1,2,3-tricarboxyl benzene, 3- and 5-hydroxy-1,2,4-tricarboxyl benzene, 2-hydroxy-1,3,5-tricarboxyl benzene, and the like;

dihydroxy-benzene tricarboxylic acids such as 4,5-dihydroxy-1,2,3-tricarboxyl benzene, 3,6-dihydroxy-1,2,4-tricarboxyl benzene, 2,4-dihydroxy-1,3,5-tricarboxyl benzene, and the like; and trihydroxy-benzene tricarboxylic acids such as 4,5,6-trihydroxy-1,2,3-tricarboxyl benzene, 3,5,6-trihydroxy-1,2,4-tricarboxyl benzene, 2,4,6-trihydroxy-1,3,5-tricarboxyl benzene, and the like.

Preferably, Y is the halo anion, especially chloro; or the anion of $C_{2-8}$ or $C_{2-6}$ alkanoic acid, especially acetic acid; or the anion of $C_{3-8}$ or $C_{3-6}$ alkanedioic acid, especially mono-succinic acid; or the anion of $C_{4-8}$ or $C_{4-6}$ alkanedioic acid, especially mono-maleic acid; or the anion of $C_{5-8}$ or $C_{5-6}$ alkadienoic acid, especially sorbic acid; or the anion of hydroxy-$C_{2-8}$ or $C_{2-6}$ alkanoic acid, especially lactic acid; or the anion of hydroxy-$C_{5-8}$ or $C_{6-8}$ alkanetrioic acid, especially mono-citric acid; or the anion of dihydroxy-$C_{3-8}$ or $C_{3-6}$ alkanedioic acid, especially tartaric acid; and the like.

In particular, Y is the chloro anion or the anion of hydroxy-$C_{2-6}$ alkanoic acid and especially lactic.

The trityl-halides required as starting materials are clearly characterized by the formula (IIa) above.

The N-trityl-imidazoles usable as starting materials are clearly characterized by the formula (IIIa) above.

Some of these starting trityl-halides are known. The new starting trityl-halides may be prepared in the same manner as the known ones.

Preparation of such starting trityl-halides may be affected as follows: first, the Grignard reagent of the mono-substituted benzene is prepared according to the usual methods. The mono-substituted phenylmagnesium bromide so obtained is then reacted with benzophenone. The organometallic complex compound obtained is subjected to hydrolysis, the appropriate alcohol being formed [compare J. Org. Chem., 7, 392 (1942)].

From the alcohols the chlorides can be obtained simply by reaction with anhydrous hydrogen chloride or with thionyl chloride. The hydroxyl group is replaced by chlorine [compare J. Org. Chem., 7, 392 (1942)].

Of course, the starting imidazole of formula (IIb) above is a well known compound.

According to the present invention, in the reaction of substituted trityl-halides with imidazole, polar inert organic solvents are used as solvents. These include for example, nitriles, such as acetonitrile; sulfoxides, such as dimethylsulfoxide; formamides, such as dimethyl formamide; ketones, such as acetone; ethers, such as diethyl ether; nitroalkanes, such as nitromethane; unsymmetrical hydrocarbons, such as chloroform; and the like. Particularly well suited are polar inert organic solvents which have a dielectric constant of more than 2.4.

The production reaction is carried out in the presence of an acid-binder, i. e. acid-binding agent. Preferably, a suitable excess of imidazole is used. A tertiary amine may, however, also be added, such as triethylamine or dimethylbenzylamine. But the other organic acid-binders customarily employed may also be used.

The reaction temperatures can be varied within a fairly wide range. In general, the work is carried out at substantially between about 0° – 100° C, preferably between about 45° – 90° C.

When carrying out the production process according to the present invention, the starting materials are used in a molar ration of about 1:1, with about an equimolar amount of acid-binder. The reaction times depend on the reaction temperature and extend from about 3 to 24 hours. When working up, the solvent is removed and the reaction product is freed from amine hydrochloride by washing with water or, if the amine hydrochloride is sparingly soluble in water, it may be separated with an organic solvent.

The starting N-trityl-imidazoles of the formula (IIIa) are obtained in particularly favorable manner when the appropriate starting trityl-halide is reacted with imidazole in a polar inert organic solvent, such as acetonitrile, dimethyl formamide or nitromethane, at a temperature of from 0° to 100° C in the presence of an acid binder, such as triethylamine or pyridine.

Trityl chloride is already known. Some of the monosubstituted starting tritylhalides are known. Those starting tritylhalides which are new can be prepared in the same manner as the known ones.

The preparation of the mono-substituted trityl chlorides may be carried out as follows:

The Grignard compound of the mono-substituted benzene is prepared. The phenylmagnesium bromide so obtained is then reacted with benzophenone. The organometallic complex compound obtained is subjected to hydrolysis, the appropriate alcohol being formed (compare J. Org. Chem. 7, 392 (1942)).

The chloride may be easily prepared from the alcohol, when the alcohol is reacted with anhydrous hydrogen chloride or with thionyl chloride. The hydroxyl group is replaced by chlorine (compare J. Org. Chem. 7, 392 (1942)).

The acids usable as starting materials for the process according to the invention are of course also known and include inorganic monobasic or polybasic acids, or organic aliphatic mono- or poly- carboxylic acids which may be saturated or unsaturated, or aromatic mono- or poly-carboxylic acids. These organic acids may be substituted, preferably by one or more hydroxyl groups.

It is preferable to use acids which are not phytotoxic. As is known, some very specific organic acids have a phytotoxic activity. These include the substituted phenoxyacetic acids, phenoxypropionic acids and phenoxy-butyric acids, such as 2,4-dichlorophenoxyacetic acid and 2-methyl-4-chloro-phenoxy-propionic acid.

Particularly suitable acids, for example, include:

hydrochloric acid, hydrofluoric acid, sulfuric acid, phosphoric acid, nitric acid, acetic acid, glycollic acid, lactic acid, malonic acid, succinic acid, glutaric acid, adipic acid, sorbic acid, pyroterebic acid, fumaric acid, maleic acid, citric acid, citraconic acid, tartaric acid, malic acid, muconic acid, allylmalonic acid, benzoic acid, salicylic acid, and the like.

The salt production reaction may be carried out in the presence of solvents, which term includes mere diluents.

These solvents and diluents include especially the chlorinated hydrocarbons, such as chlorobenzene and carbon tetrachloride; ethers, such as diethyl ether, dioxan and tetrahydrofuran; nitriles, such as acetonitrile; amides, such as dimethyl formamide; and sulfoxides, such as dimethyl sulfoxide; and the like. It is expedient to use strongly polar solvents which dissolve both reaction components as completely as possible. Aqueous diluents are less suitable since losses may occur because of hydrolytic splitting up of the N-trityl compound.

The reaction temperatures which may be used can be varied within a fairly wide range. In general, the reaction is carried out at substantially between about −10° to 60° C, preferably between about 0° to 50° C.

When carrying out the reaction, about one mol of acid is normally used for each mol of imidazole, i.e. whereby to form the equivalent salt. The reactants are suitably mixed in a solvent which, after the reaction, is evaporated off wholly or in part. If is often expedient to add ether to promote crystallization.

Advantageously, the particular new active compounds according to the present invention exhibit a strong fungitoxic activity. Because of their low toxicity to warm-blooded animals, they are suitable for the control of undesired fungus growth. Their good compatibility with higher plants permits the use of the instant compounds as plant protection agents against fungal plant diseases.

The instant active compounds are particularly suitable for the control of phytopathogenic fungi on above-the-soil parts of plants, as well as against phytopathogenic fungi which attack the plants from the soil.

The instant active compounds exhibit a particularly high fungicidal potency against powdery mildew fungi from the family of the Erysiphaceae, for example against the fungi of the genera Erysiphe, Oidium and Podosphaera; and the like. The active compounds of the present invention may, however, also be used with good results for the control of other phytopathogenic fungi, for example fungi which cause diseases in rice and ornamental plants. The instant active compounds show a good activity against *Piricularia oryzae*, *Pellicularia sasakii* and *Cochliobolus miyabeanus*, three pathogenic agents which occur in rice, and against *Cercospora musae*; and the like. Furthermore, the growth of *Phialosphora cinerescens*, a fungus which attacks carnations from the soil, is also inhibited.

The instant active compounds are distinguished by a high effectiveness in very low concentrations and by a good compatibility with plants. Doses higher than necessary for the fungicidal effect can therefore be accepted by the plants.

The active compounds according to the instant invention can be utilized, if desired, in the form of the usual formulations or compositions with inert conventional pesticidal diluents or extenders, i.e. inert conventional pesticidal dispersible carrier vehicles, such as solutions, emulsions, suspensions, emulsifiable concentrates, spray powders, pastes, soluble powders, dusting agents, granules, etc. These are prepared in known manner, for instance by extending the active compounds with conventional pesticidal dispersible liquid diluent carriers and/or dispersible solid carriers optionally with the use of carrier vehicle assistants, e.g. conventional pesticidal surface-active agents, including emulsifying agents and/or dispersing agents, whereby, for example, in the case where water is used as diluent, organic solvents may be added as auxiliary solvents. The following may be chiefly considered for use as carrier vehicles for this purpose: inert dispersible liquid diluent carriers including inert organic solvents, such as aromatic hydrocarbons (e.g. benzene, toluene, xylene, etc.), halogenated, especially chlorinated, aromatic hydrocarbons (e.g. chlorobenzenes, etc.), paraffins (e.g. petroleum fractions), chlorinated aliphatic hydrocarbons (e.g. methylene chloride, etc.), alcohols (e.g. methanol, ethanol, propanol, butanol, etc.), amines (e.g. ethanolamine, etc.), ethers, ether-alcohols (e.g. glycol monomethyl ether, etc.), amides (e.g. dimethyl formamide, etc.), sulfoxides (e.g. dimethyl sulfoxide, etc.), ketones (e.g. acetone, etc.), and/or water; as well as inert dispersible finely divided solid carriers, such as ground natural minerals (e.g. kaolins, alumina, silica, chalk, i.e. calcium carbonate, talc, kieselguhr, etc.) and ground synthetic minerals (e.g. highly dispersed silicic acid, silicates, e.g. alkali silicates, etc.); whereas the following may be chiefly considered for use as conventional carrier vehicle assistants, e. g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfonates, aryl sulfonates, etc., and especially alkyl aryl-polyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other fungicides, or herbicides, insecticides, bactericides, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95 percent, and preferably 0.5–90 percent, by weight of the mixture, whereas carrier composition mixtures suitable for direct application or field application generally contemplate those in which the active compound is present in an amount substantially between about 0.00001–2 percent, preferably 0.001–1 percent, by weight of the mixture. Thus, the present invention contemplates over-all compositions which comprise mixtures of a conventional dispersible carrier vehicle such as (1) a dispersible carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally about 0.00001–95 percent, and preferably 0.001–95 percent, by weight of the mixture.

The active compounds can also be used in accordance with the well known ultra-low-volume process with good success, i.e. by applying such compound if normally a liquid, or by applying a liquid composition containing the same, via very effective atomizing equipment in finely divided form, e.g. average particle diameter of from 50–100 microns, or even less, i.e. mist form, for example by airplane crop spraying techniques. Only up to at most about a few liters/hectare are needed, and often amounts only up to about 1 quart/acre, preferably 2–16 fluid ounces/acre, are sufficient. In this process it is possible to use highly concentrated liquid compositions with said liquid carrier vehicles containing 10–80 percent, preferably 20–60 percent, or generally from about 20 to about 95 percent by weight of the active compound, or even the 100 percent active substance alone, e.g. about 10–100 percent by weight of the active compound.

In particular, the present invention contemplates methods of selectively killing, combating or controlling fungi, which comprises applying to at least one of (a) such fungi and (b) their habitat, i.e. the locus to be protected, a fungicidally effective or toxic amount of the particular active compound of the invention alone or together with a carrier vehicle as noted above. The instant formulations or compositions are applied in the usual manner, for instance by spraying, atomizing, vaporizing, scattering, dusting, watering, sprinkling, pouring, and the like.

It will be realized, of course, that the concentration of the particular active compound utilized in admixture with the carrier vehicle will depend upon the intended application. Therefore, in special cases, it is possible to go above or below the aforementioned concentration ranges.

The fungicidal effectiveness of the new compounds of the present invention is illustrated, without limitation, by the following examples.

EXAMPLE 1

Podosphaera Test (powdery mildew of apples) [Protective]

Solvent: 4.7 parts by weight acetone
Emulsifier: 0.3 parts by weight alkylaryl polyglycol ether
Water: 95.0 parts by weight The amount of the particular active compound required for the desired concentration of such active compound in the spray liquid is mixed with the stated amount of solvent, and the resulting concentrate is diluted with the stated amount of water which contains the stated emulsifier.

Young apple seedlings in the 4 – 6 leaf stage are sprayed (treated) with the active compound spray liquid until dripping wet. The plants remain in a greenhouse for 24 hours at 20° C and at a relative atmospheric humidity of 70 percent. The plants are then inoculated by dusting with conidia of the apple powder mildew causative organism (*Podosphaera leucotricha* Salm.) and placed in a greenhouse at a temperature of 21°–23 C and at a relative atmospheric humidity of about 70 percent.

Ten days after the inoculation, the infestation of the seedlings is determined as a percentage of the untreated but also inoculated control plants.

0 percent means no infestation; 100 percent means that the infestation is exactly as great as in the case of the control plants.

The particular active compounds tested, their concentrations and the results obtained can be seen from the following Table 1:

Known:

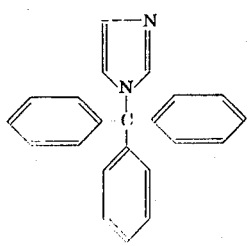
(A)    46    58    65

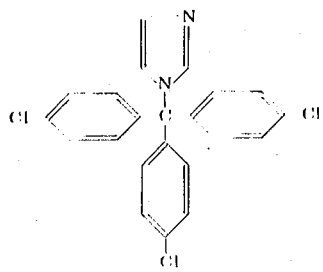
(B)    90    98    98

Other compounds tested:

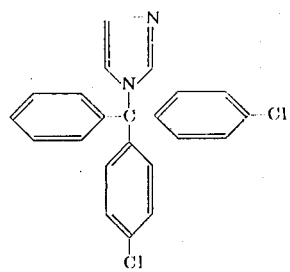
(C)    39    55

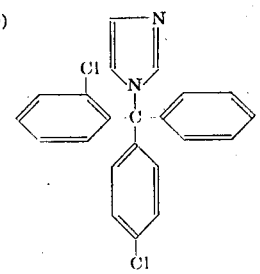
(D)    34    55 ......

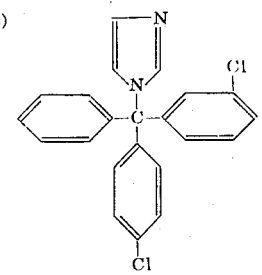
(E)    34    54 ........

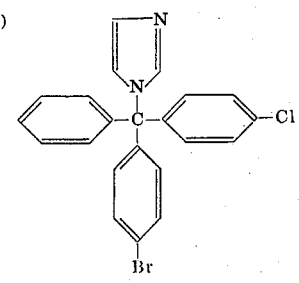
(F)    ............... 39

According to the invention: Active compounds corresponding to formula (I) above in which R has the following meaning:

| | | | |
|---|---|---|---|
| ($2_1$) R=p-F | 0 | 14 | 34 |
| ($1_2$) R=p-Cl | 5 | 13 | 14 |
| ($4_1$) R=m-Cl | 0 | ....... | 1 |
| ($5_1$) R=p-Br | 3 | ....... | 24 |
| ($7_1$) R=o-Cl | 0 | ....... | 0 |

TABLE 1
Podosphaera test (protective)

| Active compound | Infestation as a percentage of the infestation of the untreated control with a concentration of active compound (in percent) of— | | |
|---|---|---|---|
| | 0.0062 | 0.0031 | 0.00156 |

EXAMPLE 2

A further test was carried out in the same manner as Example 1, with the following results:

TABLE 2

Podosphaera Test (protective)

| Active Compound | Infestation as a percentage of the infestation of the untreated control with a concentration of active compound (in %) of | | |
|---|---|---|---|
| | 0.0062 | 0.0031 | 0.00156 |
| $(8_1)$ R = o—F | 0 | 0 | 10 |
| $(9_1)$ R = m—F | 0 | 0 | 18 |

EXAMPLE 3

Erysiphe Test
Solvent: 4.7 parts by weight acetone
Emulsifier: 0.3 parts by weight alkylaryl polyglycol ether
Water: 95.0 parts by weight
The amount of the particular active compound required for the desired concentration in the spray liquid is mixed with the stated amount of the solvent, and the resulting concentrate is diluted with the stated amount of water containing the stated emulsifier.

Young cucumber plants (Delikatess variety) with about three foliage leaves are sprayed (treated) with the active compound spray liquid until dripping wet. The cucumber plants remain in a greenhouse for 24 hours to dry. The plants are then, for the purpose of inoculation, dusted with conidia of the fungus *Erysiphe polyphaga*. The plants are subsequently placed in a greenhouse at 23°–24° C and at a relative atmospheric humidity of about 75 percent.

After 12 days, the infestation of the cucumber plants is determined as a percentage of the untreated but also inoculated control plants. 0 percent means no infestation; 100 percent means that the infestation is exactly as great as in the case of the control plants.

The particular active compounds tested, their concentrations and the results obtained can be seen from the following Table 3:

TABLE 3

Erysiphe test

| Active compound | Infestation as a percentage of the infestation of the untreated control with a concentration of active compound (in percent) of— | | | |
|---|---|---|---|---|
| | 0.025 | 0.00078 | 0.00019 | 0.00009 |
| Known: | | | | |
| (A) 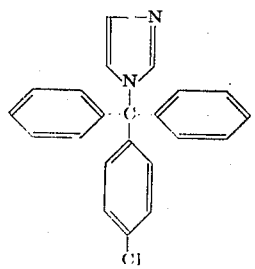 | 0 | 10 | 35 | 60 |
| (B) 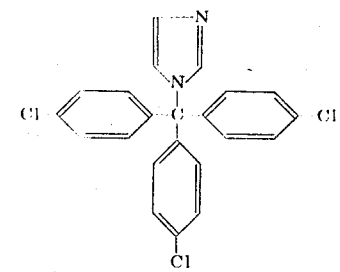 | 100 | 100 | 100 | 100 |
| Other compounds tested: | | | | |
| (C) 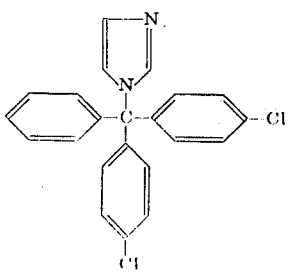 | 0 | 7 | 50 | |

TABLE 3 —Continued

Erysiphe test

| Active compound | Infestation as a percentage of the infestation of the untreated control with a concentration of active compound (in percent) of— | | | |
|---|---|---|---|---|
| | 0.025 | 0.00078 | 0.00019 | 0.00009 |
| (D) 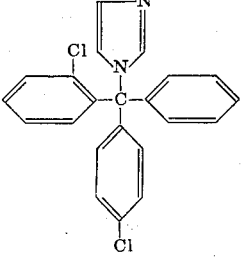 | 0 | 43 | 80 | |
| (E) 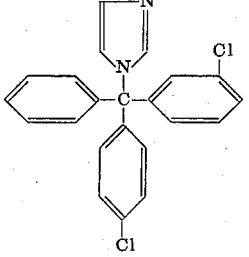 | 0 | 20 | 50 | |
| (F) 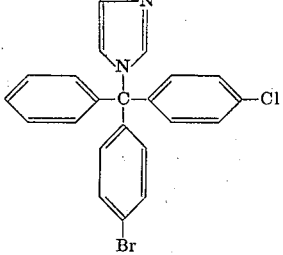 | 0 | 47 | 53 | |
| According to the invention: Active compounds corresponding to formula (I) above in which R has the following meaning: | | | | |
| ($2_2$) R=p-F | 0 | 0 | 5 | |
| ($1_3$) R=p-Cl | 0 | 0 | 0 | 15 |
| ($4_2$) R=m-Cl | 0 | 0 | 0 | |
| ($7_2$) R=o-Cl | 0 | 0 | 0 | |

EXAMPLE 4

A further test was carried out in a similar manner as Example 3, with the following results:

TABLE 4

Erysiphe Test

| Active Compound | Infestation as a percentage of the infestation of the untreated control with a concentration of active compound (in %) of | | | |
|---|---|---|---|---|
| | 0.025 | 0.00078 | 0.00019 | 0.00009 |
| ($8_2$) R = o–F | 0 | 0 | 3 | 13 |
| ($9_2$) R = m–F | 0 | 0 | 3 | 10 |

EXAMPLE 5

Mycelium growth Test
Nutrient medium used:
20 parts by weight agar-agar
30 parts by weight malt extract
950 parts by weight distilled water
Proportion of solvent to nutrient medium:
2 parts by weight acetone
100 parts by weight agar nutrient medium The amount of the particular active compound required for the desired concentration of such active compound in the nutrient medium is mixed with the stated amount of solvent. The resulting concentrate is thoroughly mixed, in the stated proportion, with the liquid nutrient medium (which has been cooled to 42° C) and is then poured into Petri dishes of 9 cm diameter. Control dishes to which the active compound preparation has not been added are also set up.

When the nutrient medium has cooled and solidified, the dishes are inoculated with the species of fungi stated in the table below and incubated at about 21° C.

Evaluation is carried out after 4–10 days, dependent upon the speed of growth of the fungi. When evaluation is carried out, the radial growth of the mycelium on the treated nutrient media is compared with the growth on the control nutrient media. In the evaluation of the fungus growth, the following characteristic values are used:

0 no fungus growth
1 very strong inhibition of growth
2 medium inhibition of growth
3 slight inhibition of growth
4 growth equal to that of untreated control.

The particular active compounds tested, their concentrations and the results obtained can be seen from the following Table 5:

TABLE 5

Mycelium growth test

| Active compound | Concentration of active compound in p.p.m. | Fungi | | | | |
|---|---|---|---|---|---|---|
| | | Piricularia oryzae | Phialophora cinerescens | Pellucularia sasakii | Cercospora musae | Cochliobolus miyabeanus |
| Known: (B) | 10 | 4 | 4 | 4 | 4 | 4 |
| According to the invention: Active compounds corresponding to formula (I) above in which R has the following meaning: | | | | | | |
| (4₃) R=m-Cl | 10 | 0 | 0 | 2 | 0 | 0 |
| (5₂) R=p-Br | 10 | 0 | 0 | 4 | 0 | 1 |
| (7₃) R=o-Cl | 10 | 0 | 0 | 3 | 0 | 0 |
| (1₄) R=p-Cl | 10 | 0 | 0 | 4 | 0 | 0 |
| (2₃) R=p-F | 10 | 0 | 1 | 2 | 0 | 0 |

The process for producing the particular new compounds of the present invention is illustrated, without limitation, by the following further examples:

EXAMPLE 6

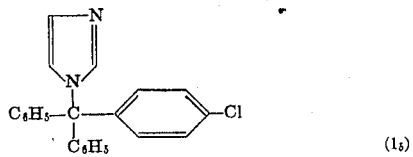

(1₅)

156.5 g (0.5 mol) of (p-chlorophenyl)-(diphenyl)-methyl chloride and 34 g (0.5 mol) imidazole are dissolved in 500 ml acetonitrile, with stirring, and 51 g (0.5 mol) triethylamine are added, whereupon separation of triethylamine hydrochloride occurs even at room temperature. In order to complete the reaction, heating at 50° C is carried out for three hours. After cooling, 1 liter of benzene is added and the reaction mixture is stirred, then washed salt-free with water. The benzene solution is dried over anhydrous sodium sulfate, filtered and concentrated by evaporation; giving 167 g of crude 1-[(p-chlorophenyl)-(bisphenyl)-methyl]-imidazole, m.p. 125° C. By recrystallization from 200 ml benzene and 100 ml ligroin, 115 g (= 71 percent of the theory) of pure 1-[(p-chlorophenyl)-(bis-phenyl)-methyl]-imidazole of m.p. 140° C are obtained.

EXAMPLE 7

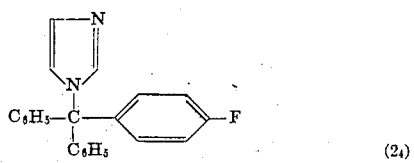

(2₄)

34 g (0.5 mol) imidazole are dissolved at room temperature, with stirring, in a solution of 148.25 g (0.5 mol) of (p-fluorophenyl)-(diphenyl)-methyl chloride in 500 ml acetonitrile. Following this, 51 g (0.5 mol) triethylamine are added dropwise; triethylamine hydrochloride separates immediately upon heating. For completion of the reaction, the mixture is heated at 50° C for 3 hours. After cooling, the reaction mixture is stirred together with 1 liter of benzene and washed salt-free with water. The benzene solution is dried over anhydrous sodium sulfate, filtered and concentrated by evaporation; giving 148 g of crude 1-[(p-fluorophenyl)-(bisphenyl)-methyl]-imidazole of m.p. 146° C (= 91 percent of the theory). By recrystallization from 300 ml benzene and 50 ml ligroin, the m.p. rises to 148°C.

The (p-fluorophenyl)-(diphenyl)-methyl chloride used as starting material can be prepared as follows: 174.9 g (1 mol) p-fluoro-bromobenzene in 175 ml ether are slowly added dropwise to 24.3 g (1 gram-atom) magnesium in 300 ml ether. After all the magnesium is dissolved, a solution of 182 g (1 mol) benzophenone in 500 ml ether is added dropwise. The magnesium salt of the alcohol separates from the initially deep-violet solution towards the end of the reaction. By washing with 10 percent ammonium chloride solution, the alcohol is obtained which, without isolation, is immediately further processed by dissolving it in 1 liter of benzene, adding 50 g of calcium chloride and introducing hydrogen chloride gas until saturation. After filtration and removal of the solvent, the resulting crystal slurry is vigorously suction filtered and the crystals obtained are washed with petroleum ether. 205 g (= 69 percent of the theory) of (p-fluorophenyl)-(diphenyl)-methyl chloride of m.p. 88° C are obtained.

EXAMPLE 8

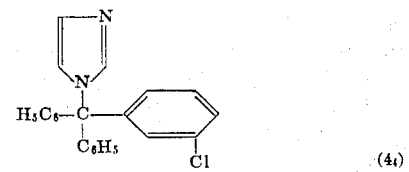

(4₁)

27.2 g (0.4 mol) imidazole and 62.8 g (0.2 mol) of (m-chlorophenyl)-(diphenyl)-methyl chloride are heated to 80° C for 4 hours in 150 ml of dry acetonitrile and 50 ml dimethyl formamide. The solvent is then drawn off and the residue is digested with water to remove the imidazole hydrochloride. The residue is taken up in methylene chloride, dried over sodium sulfate, and the viscous oil remaining behind after the distilling off of the solvent is recrystallized from cyclohexane. 52 g (75 percent of the theory) of 1-[(m-chlorophenyl)-(bisphenyl)-methyl]-imidazole of m.p. 101° C are obtained.

In analogous manner, the following compounds of the general formula (I) above are prepared:

| Compound | R    | m.p. °C |
|----------|------|---------|
| $(7_4)$  | o-Cl | 140     |
| $(5_3)$  | p-Br | 152     |
| $(8_3)$  | o-F  | 185     |
| $(9_3)$  | m-F  | 174     |

It will be realized by the artisan that all of the foregoing compounds contemplated by the present invention possess the desired strong fungicidal properties, with regard to a broad spectrum of activity, as well as a comparatively low toxicity toward warm-blooded creatures and a concomitantly low phytotoxicity, enabling such compounds to be used with correspondingly favorable compatibility with warm-blooded creatures and plants for more effective control and/or elimination of fungi by application of such compounds to such fungi and/or their habitat.

It will be appreciated that the instant specification and examples are set forth by way of illustration and not limitation, and that various modifications and changes may be made without departing from the spirit and scope of the present invention.

EXAMPLE 9

Example 1 was repeated using the compounds and obtaining the results given in Table 6 below.

TABLE 6
Podosphaera test (protective)

| Active compound corresponding to formula (Ia) in which R and $Y^{\ominus}$ have the following meaning, respectively: | | Infestation as a percentage of the infestation of the untreated control with a concentration of active compound (in percent) of— | |
|---|---|---|---|
| $Y^{\ominus}$ | R | 0.0031 | 0.00156 |
| $(10_1)$ ... $Cl^{\ominus}$ | o-Cl | 0 | 3 |
| $(11_1)$ ... $\begin{array}{c}CH_3\\|\\CHOH\\|\\CO_2^{\ominus}\end{array}$ | o-F | 0 | 2 |
| $(12_1)$ ... $\begin{array}{c}CH_3\\|\\CHOH\\|\\CO_2^{\ominus}\end{array}$ | m-F | 5 | 16 |
| $(13_1)$ ... $Cl^{\ominus}$ | p-F | 18 | 15 |
| $(14_1)$ ... $\begin{array}{c}CH_3\\|\\CHOH\\|\\CO_2^{\ominus}\end{array}$ | p-F | 21 | 18 |
| $(15_1)$ ... 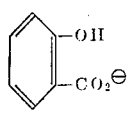 | p-F | 5 | 15 |
| $(16_1)$ ... $\begin{array}{c}CH_3\\|\\CHOH\\|\\CO_2^{\ominus}\end{array}$ | p-Cl | 31 | 31 |
| $(17_1)$ ... $Cl^{\ominus}$ | m-Cl | 0 | 9 |
| $(18_1)$ ... $\begin{array}{c}CH_3\\|\\CHOH\\|\\CO_2^{\ominus}\end{array}$ | m-Cl | 0 | 16 |

EXAMPLE 10

Example 3 was repeated using the compounds and obtaining the results given in Table 7 below:

TABLE 7
Erysiphe test

| Active compounds corresponding to formula (Ia), in which R and $Y^{\ominus}$ have the following meaning, respectively: | | Infestation as a percentage of the infestation of the untreated control with a concentration of active compound (in percent) of 0.00019 |
|---|---|---|
| $Y^{\ominus}$ | R | |
| $(11_2)$ ... $\begin{array}{c}CH_3\\|\\CHOH\\|\\CO_2^{\ominus}\end{array}$ | o-F | 0 |
| $(12_2)$ ... $\begin{array}{c}CH_3\\|\\CHOH\\|\\CO_2^{\ominus}\end{array}$ | m-F | 7 |
| $(14_2)$ ... $\begin{array}{c}CH_3\\|\\CHOH\\|\\CO_2^{\ominus}\end{array}$ | p-F | 10 |
| $(16_2)$ ... $\begin{array}{c}CH_3\\|\\CHOH\\|\\CO_2^{\ominus}\end{array}$ | p-Cl | 20 |
| $(17_2)$ ... $Cl^{\ominus}$ | m-Cl | 0 |
| $(18_2)$ ... $\begin{array}{c}CH_3\\|\\CHOH\\|\\CO_2^{\ominus}\end{array}$ | m-Cl | 0 |

The process for producing the particular new compounds of the present invention is illustrated, without limitation, by the following further Examples:

EXAMPLE 11

1-[(p-chlorophenyl)-(bisphenyl)-methyl]-imidazolium chloride $(19_1)$ 20 g 1-[(p-chlorophenyl)-(bisphenyl)-methyl]-imidazole are dissolved in 250 ml carbon tetrachloride. Hydrogen chloride is introduced at room temperature until about 1.5 equivalents of hydrogen chloride are taken up. The hydrochloride precipitates and, after being left to stand for two hours, is filtered off with suction, washed with carbon tetrachloride and dried.

Yield: 22 g of colorless crystalline powder of m.p. 128°–130° C.

In a manner analogous to Example 11 the compounds of Example 12 are prepared:

EXAMPLE 12

| $Y^{\ominus}$ | R | M.P., °C. |
|---|---|---|
| $(10_2)$ ... $Cl^{\ominus}$ | o-Cl | 159 |

EXAMPLE 12 —Continued

| | Y⁻ | R | M.P. °C |
|---|---|---|---|
| (11₃) | CH₃–CHOH–CO₂⁻ | o-F | 120 |
| (12₃) | CH₃–CHOH–CO₂⁻ | m-F | 110 |
| (13₂) | Cl⁻ | p-F | 110 |
| (14₃) | CH₃–CHOH–CO₂⁻ | p-F | 95 |
| (15₂) | 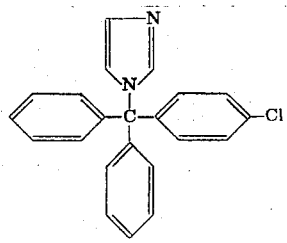 | p-F | 80 |
| (16₃) | CH₃–CHOH–CO₂⁻ | p-Cl | 90 |
| (17₃) | Cl⁻ | m-Cl | 153-155 |
| (18₃) | CH₃–CHOH–CO₂⁻ | m-Cl | 80-90 |

Preparation of
1-[(p-chlorophenyl)-(bisphenyl)-methyl]-imidazole:

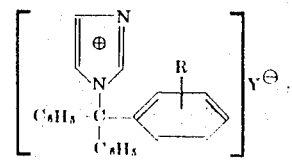

(IIab)

13.6 g (0.2 mol) imidazole are dissolved in 200 ml of dry acetonitrile, and a solution of 31.4 g (0.1 mol) (p-chlorophenyl)-(bisphenyl)-methyl chloride in 50 ml dimethyl formamide is added. Heating at 80° C is effected for 3 hours, followed by clarification with activated charcoal, distillation of the solvent, and removal of the imidazole hydrochloride by digestion of the residue with water. After drying, recrystallization from light petroleum is effected.

Yield: 31 g of colorless crystalline powder of m.p. 139°-140° C

Preparation of the (p-chlorophenyl)-(bisphenyl)-methyl chloride required as above starting material:

205 g bromobenzene and 29 g magnesium are reacted in 1 liter of ether to give phenylmagnesium bromide and to this there are added dropwise 216 g of p-chlorobenzophenone dissolved in 1 liter of benzene, and stirring is effected for 24 hours. Hydrolysis is then carried out with dilute hydrochloric acid, the solvent layer is taken off, and drying and distillation are then effected. 306 g (p-chloro-phenyl)-(bisphenyl)-carbinol are obtained. This is taken up in 1 liter of benzene, 50 g calcium chloride are added, and hydrogen chloride is introduced into the solution until saturation. The oily product obtained after removal of the solvent crystallizes after some time. By vigorous suction filtration, 220 g (p-chlorophenyl)-(bisphenyl)-methyl chloride of m.p. 88° C are obtained.

What is claimed is:

1. An antifungal composition useful for controlling fungal plant diseases which comprises an antifungal effective amount of a compound of the formula:

wherein
R is m-chloro and $Y^{\ominus}$ is $CH_3$
|
$CHOH$
|
$CO_2^{\ominus}$, in combination with a solid or liquid diluent or carrier.

2. An antifungal composition according to claim 1, in the form of a solution.
3. An antifungal composition according to claim 1, in the form of an emulsion.
4. An antifungal composition according to claim 1 in the form of a suspension.
5. An antifungal composition according to claim 1 in the form of a powder.
6. An antifungal composition according to claim 1 in the form of a paste.
7. An antifungal composition according to claim 1 in the form of granules.
8. An antifungal composition according to claim 1, wherein the compound is present in an amount substantially between about 0.00001 to 95 percent.
9. A method for controlling fungal diseases in plants which comprises applying to the fungi or to the plant to be protected a fungicidally effective amount of a compound of the formula:

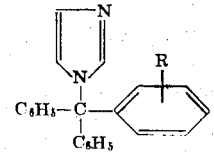

wherein R is chloro, bromo or fluoro, or a salt thereof.

10. A method according to claim 9, wherein the application is by spraying.
11. A method according to claim 9, wherein the application is by scattering the compound on the fungi or plant to be protected.
12. A method according to claim 9, wherein the application is by dusting the compound on the fungi or plant to be protected.
13. A method according to claim 9, wherein R is o-, m- or p-chloro, o-, m- or p-fluoro or p-bromo.
14. A method according to claim 9, wherein R is o-fluoro.
15. A method according to claim 9, wherein R is m-fluoro.

16. A method according to claim 9, wherein R is p-fluoro.

17. A method according to claim 9, wherein R is o-chloro.

18. A method according to claim 9, wherein R is m-chloro.

19. A method according to claim 9, wherein R is p-chloro.

20. A method according to claim 9, wherein R is p-bromo.

21. A method according to claim 9, wherein the compound is a salt.

22. A method according to claim 9, wherein R is m-chloro and $Y^{\ominus}$ is $$\begin{array}{c} CH_3 \\ | \\ CHOH \\ | \\ CO_2^{\ominus} \end{array}$$

* * * * *